United States Patent [19]

Kaeufer et al.

[11] Patent Number: 5,008,059
[45] Date of Patent: Apr. 16, 1991

[54] METHOD FOR MANUFACTURING A PLASTIC PART HAVING A SHAPE MEMORY

[75] Inventors: Helmut Kaeufer, Mettmann; Christian Kipfelsberger, Hepberg; Karl-Heinz Leyrer, Bobfingen, all of Fed. Rep. of Germany

[73] Assignee: R X S Schrumpftechnik-Garnituren GmbH, Fed. Rep. of Germany

[21] Appl. No.: 425,437

[22] Filed: Oct. 23, 1989

Related U.S. Application Data

[63] Continuation of Ser. No. 38,236, Apr. 14, 1987, abandoned.

[30] Foreign Application Priority Data

Apr. 14, 1986 [DE] Fed. Rep. of Germany ....... 3612518

[51] Int. Cl.$^5$ ................. B29C 43/04; B29C 61/06
[52] U.S. Cl. ................. 264/230; 264/296; 264/325; 264/345
[58] Field of Search ............. 264/230, 294, 296, 320, 264/325, 342 R, 345; 174/DIG. 8

[56] References Cited

U.S. PATENT DOCUMENTS

| | | | |
|---|---|---|---|
| 2,885,105 | 5/1959 | Heyl et al. | 53/487 |
| 2,994,933 | 8/1961 | Wolfe | 24/141 |
| 3,086,242 | 4/1963 | Cook et al. | 425/326.1 |
| 3,455,336 | 7/1969 | Ellis | 138/99 |
| 3,526,683 | 9/1970 | Heslop et al. | 264/22 |
| 3,542,077 | 11/1970 | Muchmore | 138/99 |
| 3,597,372 | 8/1971 | Cook | 264/230 |
| 3,662,094 | 5/1972 | Wetmore et al. | 264/230 |
| 3,988,399 | 10/1976 | Evans | 264/22 |
| 4,241,119 | 12/1980 | Smart | 428/36 |
| 4,514,351 | 4/1985 | Kaeufer et al. | 264/230 |
| 4,576,775 | 3/1986 | Kaeufer et al. | 264/325 |

FOREIGN PATENT DOCUMENTS

| | | |
|---|---|---|
| 0078465 | 5/1983 | European Pat. Off. . |
| 911541 | 4/1954 | Fed. Rep. of Germany . |
| 2856580 | 10/1980 | Fed. Rep. of Germany . |
| 2041270 | 1/1971 | France . |
| 1223967 | 3/1971 | United Kingdom . |
| 1529351 | 10/1978 | United Kingdom . |

Primary Examiner—Jill L. Heitbrink
Attorney, Agent, or Firm—Hill, Van Santen, Steadman & Simpson

[57] ABSTRACT

A method and apparatus forms a plastic part having a shape memory which has been formed to a second shape from an initial shape by the application of pressure to cause molecular orientations which are subsequently fixed by being cooled to a desired temperature and, when subjected to subsequent energy such as heating, will eliminate the molecular orientation and create a restoring force to return the part to the initial shape.

25 Claims, 3 Drawing Sheets

METHOD FOR MANUFACTURING A PLASTIC PART HAVING A SHAPE MEMORY

This is a continuation of application Ser. No. 07/038,236 filed Apr. 14, 1987 now abandoned.

BACKGROUND OF THE INVENTION

The present invention is directed to a method for manufacturing a plastic part which has a shape memory, which part can be restored when subjected to energy. A plastic part manufactured in accordance to the method and to the apparatus used in the method for manufacturing the part.

In the U.S. Pat. Nos. 3,455,336, whose disclosure is incorporated by reference thereto and which was the basis of German Letters Patent 1,525,815, an oblong, potentially branched tube-shaped or hose-shaped envelope of thermoplastic synthetic material was disclosed and this envelope was provided with a shape memory. Given application of energy, the envelope would be restored until, if possible, it reaches its original shape. This envelope is manufactured in a basic shape in accordance with one of the known methods, for example, by extrusion. Subsequently, it is subjected to a cross linking method, for example, by high-energy irradiation, and then is forceably brought into a second shape, for example, by widening in order to lend the shape memory. The shape is then "frozen in" in this condition. As needed, the shape memory is activated by the application of energy, for example, heat, so that the shape part strives to return to its original shape insofar as possible. Given such shaped parts, an especially high strength is definitely desirable, at least in certain regions, but due to this unstable shape, the region is not often able to have the strength. For these reasons, attempts have been made to lend these regions the required strength by additional shape-stable reinforcements as disclosed, for example, in U.S. Pat. No. 3,542,077, which was the basis of German 1 925 739 and whose disclosure is incorporated by reference thereto. In a shrinkable longitudinally divided envelope, a non-deformable reinforcements are embedded into the wall along the longitudinal side of the envelope and these reinforcements lend the end region of this envelope the required strength and shape stability in the closing regions at the long side. Given such shaped parts, however, various method steps, some of which are involved, for example, electron irradiation of the shaped part, are necessary so that additional measures for achieving the desired properties are required. In addition, the increased problems regarding the shape stability of the closure occurs in the critical region such as, for example, in the closing regions of an envelope because the undefined deformation of the closure elements cannot be excluded due to the heating.

German OS 28 56 580 also discloses a manufacturing method for technical parts having load-suitable structures of thermal plastic polymeric materials. Shaped parts of thermal plastic materials can be provided with a higher strength with the assistance of this measure which is disclosed therein as "pressure stretching" than could be previously achieved with injection molding, extruding, casting or other manufacturing methods. This method is a matter of a procedure wherein anisotropic structures are intentionally manufactured within the shaped part and these are favorable for later load cases. However, appropriate fixing processes are also required for the thermal shape stability of such stretched parts, and these fixing processes guarantee that the molecular orientation forceably introduced for the corresponding applications are preserved in the appertaining temperature range. The shape stability is thus also guaranteed in this temperature range. In this injection molding-pressing-stretching method, hereafter referred as an SPR method, molecular orientations are introduced into a preform under pressure during cooling and these molecular orientations are fixed under pressure at a definite fixing temperature. This results in the fact that after the fixing time, the condition comprising the property introduced into it, for example, higher strengths in defined regions. When, however, the article is again heated roughly to or, respectively, beyond the fixing temperature, the molecular orientations are cancelled and the article looses the properties which were forcefully introduced with the SPR method. It thus follows therefrom that such shaped parts having these new properties are only employable below the fixing temperature. This method was, therefore, applied in plastic parts where material properties regarding strength, hardness, friction behavior or resistance to chemicals as well were to be improved. In all of these improvements, however, the temperature range or, respectively, the maximum temperature applied therefor must be observed, since the properties would otherwise be lost, as already mentioned.

SUMMARY OF THE INVENTION

A first object of the present invention is to develop a relatively simple method with which a shrinkable behavior that is previously determined can be imposed on a plastic part so that the material properties are to be improved in a critical restoring region. A second object of the invention is to create an apparatus for the implementation of the method, while a third object is to create a plastic part manufactured in accordance with the method which exhibits desired shrinkage behaviors wherein strength properties improve in comparison to previous shrink articles are to be fashioned in the critical regions.

The first object is achieved with the assistance of a method which has the step of providing a preform of an initial or first shape such as by injection molding, extruding, pressing or casting; applying pressure to change the shape to a second shape and to introduce a molecular orientation into the part; maintaining the pressure and cooling to a fixing temperature to fix the molecular orientation therein; and then subsequently applying energy such as by heating the article to cancel the molecular orientation and create restoring forces to return the part back to the initial or first shape.

The second object of the invention is that the apparatus, which may be an injection molding, extruding, pressing or casting device has a first shaping recess for the manufacture of the preform and that the apparatus further has displacement means for displacing the preform into a second shaping recess which is composed of at least two pressure plates which comprise the contour and the shape portion required for the reshaping of the shrinkable part into the second shape. The apparatus also includes a pressure means for the pressure stretching of the preform in the second shaping recess and the apparatus comprises means for heating and means for controlling the temperature of the apparatus. The apparatus may only have a single recess for shaping the preform to the second shape and fixing the second shape.

Finally, the third object is achieved by producing the article from the method and apparatus. The article may be a non-positive locking or a positive locking connection which has, preferably, a U, V or circular shape for engaging different shaped beads on a closable envelope. It may be a clamp having overlapping legs, and may be a clamp for the closure element of an envelope or, finally, it may be the formation of beads having a memory along the edges of a plastic foil forming a closure element.

Advantages of the method in accordance with the present invention are that the article can be manufactured in one process cycle up to lending it its shape memory, however, it is also just as simple to divide the manufacturing process into a plurality of individual process steps, for example, a step of forming the preform, such as by first casting the shaped part in a basic shape or injecting it into a mold and after cooling it to a fixing temperature, then forceably deforming the preform under pressure into the shrinkable form of a second shape by the same apparatus. The molecular orientation which is established in the shape memory therefore will occur simultaneously. After a fixing time, to be respectively defined, the finished, shrinkable shaped part is ejected and can be restored or, respectively, shrunk at least approximately back to its original form by a corresponding application of energy, such as a shrink element. In contrast to conventional injection molding, thus, the SPR method is distinguishable by a second additional opening and closing motion of the closing unit in the injection molding machine. In the first method step, thus, a preform is injected in a conventional way and is dressed, i.e. cooled, to below the crystallite melting point, so that it is situated in a relatively shape-stable condition. After the cooling time has elapsed, the tool is opened and a shift of the preform into a second shaping recess occurs in a nozzle-side tool half via a slide construction. The two shaping recesses are thus present in the injection molding machine with the first for the preform and the second for the finished part form in which the pressing-stretching process is carried out. The actual pressing-stretching process thus occurs in the second method step by a renewed closing of the tool or apparatus. This thereby usually involves a pair of pressure plates which comprise the negative contour of the finished part. One pressure plate is usually fashioned as a movable forming die by means of which the pressing power for the forming under the compressive condition is exerted in the closed tool. After an approximate fixing time, the SPR shaped part which has occurred is cooled and is ejected via the ejector structure. The shrinkable finished part has, thus, been manufactured and will be deformed back into its original shape as needed by the application of heat.

As mentioned above, the method steps of the invention can also be divided. Thus, for example, it is possible that the preforms are first manufactured and do not have their shaped memory imposed on them until later on or in a corresponding second shaping apparatus as well. A requirement for this purpose, however, is a prior heat-up phase in order to bring the preforms to the required temperature. In its heated condition, the separately manufactured preform is then introduced into the forming machine and is subjected to the above-described forming process. In a first subprocess, the preform has thus been conventionally injected and control cooled, whereas the forming of the preform into the finished part occurs in a press in a later second subprocess. In this method, it is also possible to employ preforms that have been worked out from, for example, extruded or case half-finished goods. Depending on the previous of the preform, there is thus a possibility of being able to intentionally influence the properties of the finished part.

In both the above methods, however, the reshaping of the preform into a shrinkable finished part will occur. During this reshaping, i.e. modification of the shaped part geometry given approximate constant shaped part volume, a high molecular orientation will occur in the finished part at least partially due to the flowing and stretching processes. These highly oriented regions lead not only to a noticeable increase in the mechanical strength, but also lead to an increase as well as intentional shrinking in these regions. This entropy-elastic effect can be explained with the memory capability of aligned molecules clews or balls which strive for an unordered, i.e., more probable condition when reheated. On the basis of the method of the invention, it then becomes possible to optimize the shaped parts with respect to their shrinkage behavior so that a shrink element having previously defined shrink behaviors can be manufactured.

Another advantage may also be seen wherein the heretofore standard cross-linking of the plastic part and the following stretching are fundamentally not required for the manufacture of the shape memory. These cross-linking methods require rather involved systems, particularly given cross-linking methods with high-energy electron bombardment. Since no sharp limits and, thus, no targeted cross-linking regions can be created with a chemical cross-linking process, the methods with chemical cross-linking can usually be applied only to given articles having a relatively uniform cross-linking over a greater region.

On the basis of the method of the invention, however, advantages in every respect may be seen due to the molecular orientation forceably introduced and fixed in the reshaping. Thus, the required apparatus and the method steps are relatively simple in comparison to prior methods and devices and the deformation regions can be sharply and designationally limited. In addition, special advantages with respect to the material properties also occur in the manufacture of the plastic part of the invention, particularly with respect to the hardness, the loadability by external acting forces and the shrinking power.

Although no cross-linking processes are fundamentally necessary in accordance with the present invention, the shaped parts fabricated in accord with the SPR method can be additionally subjected to cross-linking, particularly by chemical cross-linking, for specific purposes in defined regions or overall as well. In this way, combined products with which the special jobs can be accomplished are created. Under certain conditions, thus, it is expedient to cross-link the envelope region giving shrinkable, longitudinally divided envelopes whereas longitudinal closing regions are treated in accordance with the new method. This has the advantage that regions having higher shrinkability have relatively soft material properties and are mixed to regions having a less pronounced shrinkability but having other material properties improved, for example being better suited for closing regions. Thus, these regions can be united in a simple way.

Dependent on the material employed and dependent on the temperature range later required, the fixing of the introduced molecular orientations required for the shrink behavior occurs under pressure at a fixing temperature to be appropriately selected, but which in any case lies at or, respectively, below the crystallite melting point or, respectively, softening range of the thermal plastic synthetic employed. The stretching, i.e. into a more stable condition of the preform, thus occurs at this given fixing temperature. The pressure stretching occurs between the pair of pressure plates having the profiling corresponding to the finished part to be manufactured so that at least one pressure plate is fashioned as a movable pressure die. Dependent on the thermal plastic material, the surface load in this pressure stretching amounts to a range of between 10 N/cm$^2$ through 10,000 N/cm$^2$ and preferably is in a range of between 500 N/cm$^2$ through 5,000 N/cm$^2$.

The required fixing time or holding time for the pressure, i.e. the time from the beginning of the application of pressure up to the release of the pressure in the stretching process amounts to a range of between 0.5 seconds and 5 minutes. Preferably, it is in a range of between 2 seconds and 2 minutes.

The temperature of the preforms at the beginning of the pressure stretching can, therefore, lie in a range of between $-30°$ C. and $200°$ C., preferably, they are in a range of between $50°$ C. and $100°$ C. whereby the temperature of the pressure plates before the stretching should preferably be in a range of between $50°$ C. and $160°$ C., dependent on the material being utilized and the temperature selected for the preforms to be stretched. Moreover, the temperature range at which the later back formation would occur can be influenced here.

The deformation during the reshaping process, for example the reshaping rate for the deforming of the preforms and, thus, for introducing the force molecular orientation should lie in a range of 0.1 mm/sec and 100 mm/sec. Preferably, the range is between 1 mm/sec and 50 mm/sec.

A multitude of modifications or alternatives are thus achieved based on the method of the invention with the appropriate selection of the aforementioned conditions so that a respectively optimum condition can be created for the desired application. This already begins in the selection of thermal plastic material for the preform so that a preselection for the degree and direction of restoring forces can already be undertaken. All amorphous and partially crystalline plastics come into consideration as materials for the part. Technically meaningful are the employment of amorphous plastics such as, for example, polystyrol, acrylnitril/butadien/stryol copolymer, polycarbonate as well as polymethylmethacrylate or of a partially crystalline plastic such as, for example, polyethylene, polypropylene, polyoxymethylene, polyethylenterephthalate, as well as polyamides. Likewise, the degree and direction of the restoring forces can be designationally influenced by the nature of the pre-history of the preform employed, for example at what temperature and by what method these preforms are manufactured. Further, the degree and direction of the restoring forces can be designatedly influenced by the selection of the pressure-stretching parameters and the pressure-stretching conditions which are recited in greater detail hereinabove. Thus, for example, the degree and direction of the restoring forces can also be influenced by the geometry and dimensions of the respective preform so that, for example, only the subregions of the preform that are to change in shape later due to shrinking when heated are stretched. In addition, the degree and direction of the restoring forces can be influenced by the modification of the fundamental building blocks of the macromolecule, i.e. the molecular structure and the interaction in the union of the molecule chains following therefrom. Such an influencing can be achieved, for example, by the corresponding build-up of copolymers, by mixing additive such as softeners, dye stuffs, soots, etc., into the copolymers. Thus, a non-cross-linked amorphous, as well as partially crystalline plastics, can also have network structures that are formed by entanglements or interloopings of molecule chains.

When such "physical networks" are stretched, these structures partially release and are reformed. Higher restoring forces of the stretched networks can occur therefrom. Thus, the restoring forces can likewise be designationally influenced by targeted mixing-in or introduction of suitable substances having, for example, polar binding character, large side groups, etc. The activity of the restoring forces required for shrinking then occurs, finally, by applying an appropriate energy, for example by heating with an open flame, hot air, infrared rays, thermal contact, or the like. The temperature required for the activation of the restoring forces lies in the range of between $50°$ C. and $250°$ C. Preferably, it is in a range of $120°$ C. and $180°$ C., and in any case lies below the melting point of the plastic material being utilized.

The restoring forces acting during restoration then occur by cancelling the introduced molecular orientation, by cancelling a previous expansion and stretching of the crystalline regions (fibriles), and/or, respectively, by formation or growth of crystalling spherulite structures or amorphous phases. These restoring forces are therefore designationally set such in the preceding operations of the SPR method that the desired back-formation or, respectively, shrinking respectively occurs at the shaped part.

Shrink tubes can thus be manufactured based on the method of the invention from plastic hoses which are initially normally extruded. They are then widened with the assistance of a conical stretching form with the widening occurring in the conditions already set forth hereinabove. Further, for example, extruded planar foils having applied or coextruded webs can be stretched to form cable envelopes wherein a positive lock or a nonpositive lock connection can potentially also be coextruded into the shaped part so that the multi-function element occurs. In this way, injection molding preforms for cables and for closures at cable fittings or the like can also be manufactured whereby the material properties improve over the prior art heretofore known can be respectively brought to bear in addition to the shrink behavior such as improved hardness, higher shrinking forces, improved temperature behavior and the like.

Additional advantages and features will be readily apparent from the following description, the drawings and claims.

DESCRIPTION OF PREFERRED EMBODIMENTS

Figure 1:
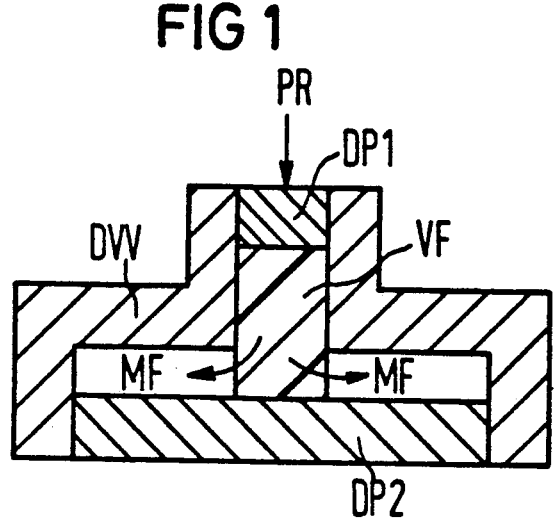
FIG. 1 is a cross sectional view of an injection molding-pressing-stretching device of the present invention for practicing the pressing-stretching method (SPR) of the present invention.
Figure 2:
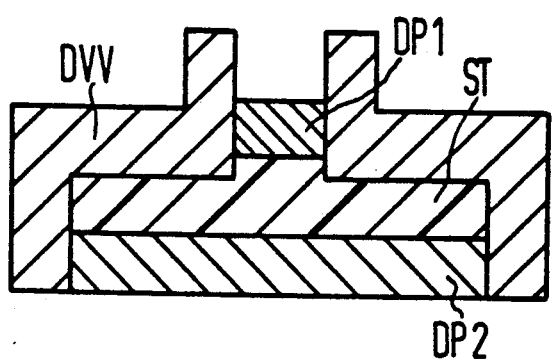
FIG. 2 is a cross sectional view of the apparatus of FIG. 1 after the pressing-stretching method has been performed.

The principals of the present invention are particularly useful when incorporated in an apparatus illustrated in FIGS. 1 and 2 for pressure stretching a preform VF into a shrinkable plastic finished part ST. In the apparatus, the preform can be formed in a chamber of the apparatus by either casting, injection molding or extruding. After the finished part ST has been formed, it can be restored to its original form by the application of heat. This behavior is referred to as shrinking and is employed for a great variety of applications in accordance with the present invention. In this shrinking or back-formation, the tasks placed upon the shaped finished part ST is fulfilled, for example by embracing an article, sealing an opening, connecting individual articles and the like.

As illustrated in FIG. 1, a principal of a pressure-stretching apparatus DVV which, for example, can also be part of an extrusion apparatus from which a corresponding preform VF can then be taken. Two pressure plates DP1 and DP2 are provided and the stretching and/or reshaping under the pressure of the preform VF situated in a solid condition and at an appropriate temperature will occur. These pressure plates DP1 and DP2 contain all the shape portions which the shrinkable part ST must exhibit as profiles. The pressure stretching apparatus DVV has already been brought to the above-specified temperature conditions for the stretching process and the apparatus is provided with means for controlling the temperature and means for heating to maintain this temperature during the following fixing time. After the introduction of the warm preform VF, the pressure plate DP1, fashioned as a pressure piston, is actuated in accordance with the particulars, wherein the second pressure plate DP2 acts as a mating plate. During the movement of the first pressure plate DP1 in a direction of arrow PR, the preform VF is then deformed whereby the material due to the deformation pressure is pressed in the indicated material flow direction as indicated by the arrows MF into the form of a second shaping recess formed by the pressure plates DP1, DP2, and walls of the pressure stretching apparatus DVV. The molecular orientation needed for the shrink behavior thereby occurs. After this second shaping recess has been filled out with the reshaped preform VF, the molecular orientations are fixed over a defined fixing time recited in greater detail hereinabove upon retention of a fixing pressure which can lie below the reshaping pressure. The fixing pressure can be removed and the finished, now shrinkable finished part ST is ejected from the shaping recess, such as by removing the plate DP2. This shape is then stable until the shrinkable part ST is again heated to the fixing temperature or above. Given the intentionally initiated shrinking process, this will occur by applying energy, preferably thermal energy. The reshaped, shrinkable part ST of FIG. 2 thereby strives to return to the original form of the preform VF indicated in FIG. 1 so that the job according to the reshaping is fulfilled.

An end of a shrinkable part manufactured in accordance with the method of the present invention is illustrated in the form of a clamp K which, for example, is used with a shrinkable envelope SU to hold together regions V on its side. For example, the shrinkable envelope SU could be composed of a thermal plastic material which has been lent a shrink behavior in a cross-linking process and subsequently stretching method. However, this could also involve any arbitrary envelope part. Beads are then applied or formed along the closure regions V on each long side, which beads form the longitudinal opening. These beads are held together by a clamp K, which is manufactured in accordance with the method of the present invention. The clamp K is fashioned as a channel portion so that as a shrinkable part, it can first be slipped lightly over the beads, so that the loose pre-fixing is established. Subsequently, the molecular orientations forceably introduced by the method of the invention is cancelled. The clamp K will then shrink and embrace the two beads in the closing region V in a clamping fashion, since the clamp strives to return to its original, initial condition which in this case results in a constriction of its channel-shaped opening.

Figure 3:
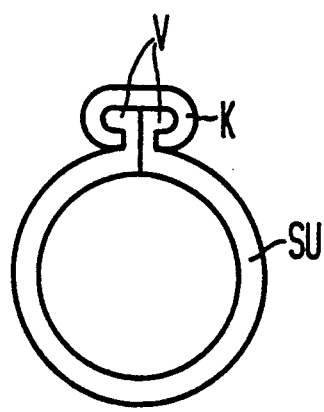
FIG. 3 is an end view of an envelope showing the application of a closing part manufactured in accordance with the present invention.
Figure 4:
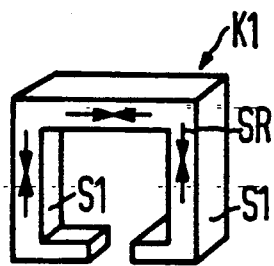
FIGS. 4, 5, 6 and 7 are perspective views showing possible formations of various closure parts for use with the envelope of FIG. 3.
Figure 5:
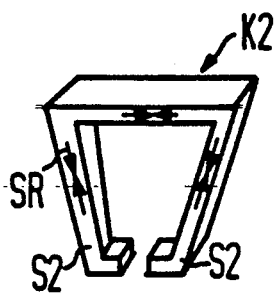
Figure 6:
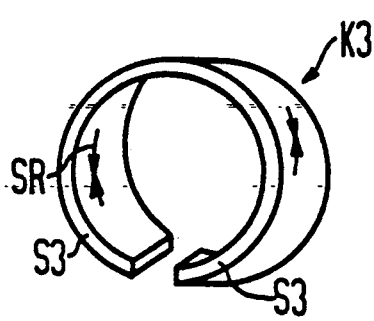

The clamps can have other configurations, such as illustrated by the clamps K1 of FIG. 4, K2 of FIG. 5, and K3 of FIG. 6. These clamps are all suitable for use of closing an envelope, such as the envelope SU of FIG. 3. The clamp K1 is particularly constructed for gripping rectangular closure beads or elements V of an envelope SU. The clamp K2 is constructed for gripping wedge-shaped closure elements or beads, and the clamp K3 is constructed for gripping semi-circular closing elements or beads. Each of the clamps K1, K2 and K3 have corresponding legs S1, S2, and S3, respectively, which legs are deformed by pressure stretching in accordance with the method of the invention and are restored in shape upon heating to shrink in accordance with the direction of the double arrows SR as indicated. Constriction and shrinking in the geometry of each part will lead to a close embrace of the closure elements hold them together. This is further promoted in that the legs become thicker as a result of the shrinking and, thus, will have an even tighter fit or grip.

Figure 7:
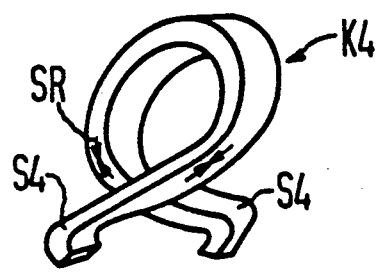

Another embodiment of the clamp is illustrated by the clamp K4 of FIG. 7. This clamp K4 has special spring properties due to an overlap of the two legs S4. In addition to the deformation path, it is also lengthened in this way. Thus, it indicates the possibilities of versatile design and adaptation in special applications because of a shrink behavior in accordance with the method of the present invention.

Figure 8:
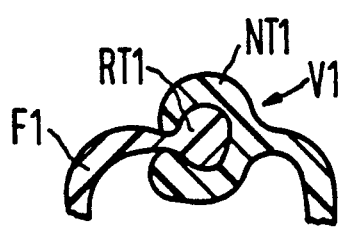
FIGS. 8, 9 and 10 are partial cross sectional views showing different embodiments of latchable closures for connecting elements wherein the latching parts change in shape with the application of heat.
Figure 9:
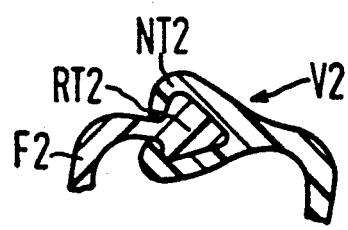
Figure 10:
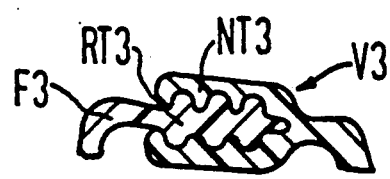

Instead of utilizing closure elements on the edge of the envelope which are gripped by a clamp, it is possible to form closure units, such as V1 of FIG. 8, for a band or planar foil F1. A closure unit V2 is for a band F2 and is illustrated in FIG. 9, while FIG. 10 illustrates a closure unit V3 for a band F3. In each of these embodiments, the edges of the bands F1, F2 and F3 are provided on one edge with a bead having a channel such as NT1 (FIG. 8), NT2 (FIG. 9), or NT3 (FIG. 10). The opposite edge is formed with a corresponding bead structure, such as RT1 of FIG. 8, RT2 of FIG. 9 and RT3 of FIG. 10. In the stressed condition, beads such as RT1, which has a substantially circular cross section can be received in a substantially circular groove or channel portion NT1 with a rather loose latching feature. With the application of heat, the bead RT1 and the channel NT1 will return to their original shape to form a tight, mutual clamping of the closure elements. In the embodiment of FIG. 9, the channel portion has a V shape to receive a V-shaped head RT2. In the embodiment of FIG. 10, the bead RT3 has a series of longitudinally extending bumps or protrusions and the groove NT3 of the channel portion has a corresponding cross sectional configuration. The required conditions in terms of tightness, strength and the like can be met dependent on the selected shape of these elements. The embodiments of FIGS. 8, 9 and 10 are only examples of possible construction. Of course, additional sealants, adhesives or the like can also be introduced between each of the elements so that a further demand in this regard can be met.

Figure 11:
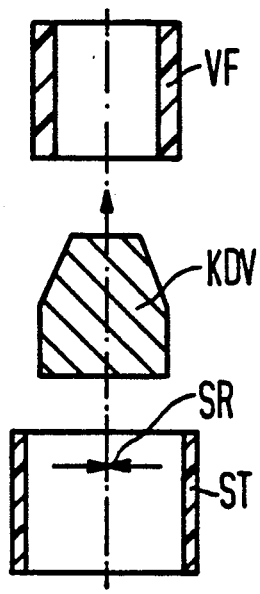
FIG. 11 is a schematic cross sectional view illustrating the steps of forcing an extruded hose over a expanding cone to form a shrinkable plastic hose in accordance with the present invention.
Figure 12:
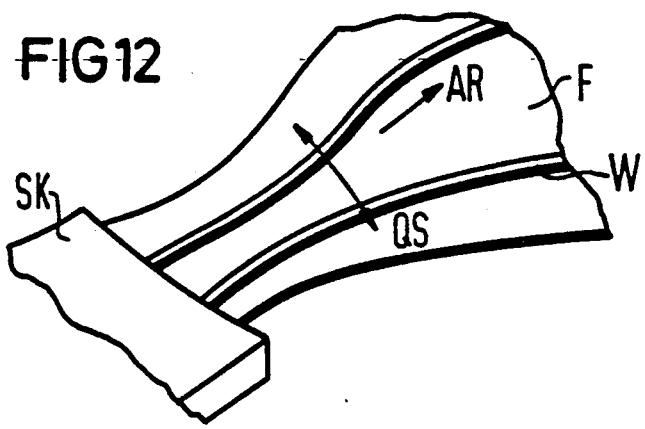
FIG. 12 is a perspective view illustrating the extrusion of a film having additional deformation by stretching.

FIG. 11 illustrates a method of the invention in accordance wherein a shrinkable hose section part ST can be manufactured from a hose-shaped preform VF by pressure stretching with the assistance of a conical pressure stretching apparatus KDV. The hose section ST then can be restored to the original shape of the preform VF with the application of heat. This hose section ST is therefore shrunken radially onto an introduced article with a firm fit. The radial shrinking direction of this hose section ST is indicated in FIG. 11 with the double arrows SR.

In another embodiment of the method, the method is shown being applied with the combined procedures. Thus, for example, a foil F is extruded from a disk-shaped die SK and can be then formed into a shrink part by bi-axial stretching in a transverse direction indicated by the arrow QS and in a longitudinal direction as indicated by an arrow AR. The stretching can be done by appropriate haul-off means in a traditional way, or in accordance with the method of pressure stretching (SPR). As illustrated, the web or foil F has also extruded beads W with "full material" which can later be provided with a shape memory with the pressure-stretch method to forceable introduce of the molecular orientations. Non-positive locking or positive locking connector elements can be manufactured in this way. Thus, it is possible for the foil F to be employed as a closure element or, respectively, a fixable enveloping element.

Figure 13A:
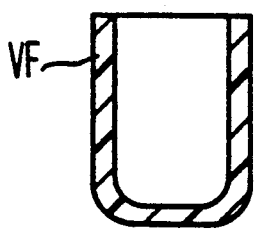
FIG. 13a is a cross sectional view of an initial preform cap.
Figure 13B:
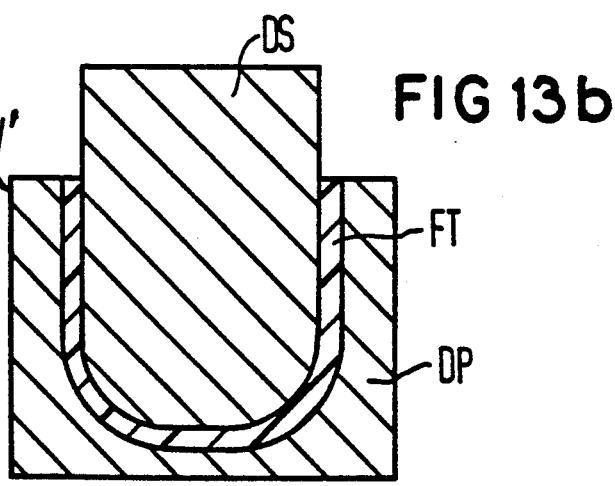
FIG. 13b is a cross sectional view of a device for stretching the cap of FIG. 13a into a shrinkable cap.

Another embodiment of the present invention is to produce a shaped part FT (FIG. 13b), which can be manufactured and used in accordance with the method of the invention. This involves a shrinkable, cap-shaped terminating element FT that is manufactured from a pre-formed VF by pressure stretching in a pressure stretching apparatus DVV'. This shrinkable part FT is manufactured in accordance with the above conditions with the assistance of a pressure die DS and of a further pressure plate or part DP. This stretching or widening process is shown in extremely simplified form and is merely intended to indicate that pressure stretching can be carried out by suitable widening means under pressure and given the temperature appropriate for the material. The molecular orientation, which is forceably introduced, then effects the restoring force in the shrinkable part FT during reheating so that this cap can be shrunken onto an element to be closed as a tube closure or the like.

These exemplary embodiments essentially show the principal of the invention, which is that the shrink memory can be impressed based on the method of pressure stretching given appropriate selection of the boundary conditions necessary for this purpose, the fixed restoring forces of this shrink member are then activatable by the heating so that a designated shape change can be started given this application of energy. This is likewise done without cross-linking processes that are involved or relatively difficult to control.

Although various minor modifications may be suggested by those versed in the art, it should be understood that we wish to employ within the scope of the patent granted hereon, all such modifications as reasonably and properly come within the scope of our contribution to the art.

We claim:

1. A method for the manufacture of plastic parts of a thermal plastic synthetic material having a crystallite melting point and a softening point, said parts having a shape memory and being restored by the application of energy to an original shape from a second shape, the method comprising the steps of providing a preform of the original shape for the part in an apparatus having a cavity of the second shape of the part, said preform being free of cross-linked material, heating the preform to a first elevated temperature below the temperature of the crystallite melting point and softening point for the synthetic material, applying pressure to said heated preform in said cavity to change the original shape to said second shape and to introduce molecular orientations into the preform to change the preform into the part, maintaining the pressure on the part and cooling the part to a second elevated temperature below the first elevated temperature to fix the molecular orientations therein, removing the pressure after reaching the second elevated temperature, removing the part from said cavity and subsequently applying energy to cancel the molecular orientations and create restoring forces to return the part back to the original shape.

2. A method according to claim 1, wherein the step of providing comprises forming the preform in an apparatus by a method selected from injection molding, extruding, pressing and casting, and said step of applying pressure to said preform in said cavity is done while the preform is maintained in the same apparatus used for forming the preform.

3. A method according to claim 1, wherein the step of providing the preform includes introducing the preform into said cavity of the apparatus where the pressure is applied to cause the molecular orientation.

4. A method according to claim 1, which includes chemically cross-linking at least portions of the plastic part after it has been deformed into the second shape.

5. A method according to claim 1, wherein the step of applying pressure applies pressure with predetermined parameters and conditions so that the desired degree and direction of the restoring forces are obtained.

6. A method according to claim 1, wherein the degree and direction of the restoring forces are influenced by the nature of the pre-history of the preform being utilized.

7. A method according to claim 1, wherein the degree and nature of the restoring forces are influenced in the finished plastic part by the selection of the thermal plastic material for the part.

8. A method according to claim 1, wherein the degree and direction of the restoring forces are influenced in the plastic part by the modification of the fundamental building blocks of the macromolecules, by the molecular structure, and the interaction of the union of the molecule chains therein.

9. A method according to claim 1, wherein the degree and direction of the restoring forces are influenced in the plastic part by the geometry and dimension of the preform.

10. A method according to claim 1, wherein the preform has a plurality of sub-regions and wherein the step of applying pressure applies pressure only to selected sub-regions of the preform.

11. A method according to claim 1, wherein the step of applying energy to create the restoring forces applies thermal energy.

12. A method according to claim 1, wherein the step of applying energy to cancel the introduced molecular orientation causes restoring forces to be activated.

13. A method according to claim 1, wherein the creation of the restoring forces incurs by cancelling the stretching and distortion of the crystalline regions.

14. A method according to claim 1, wherein the restoring forces are activated by formation and growth of crystalline and amorphous phases of the material.

15. A method according to claim 1, wherein depending on the material being utilized for the preform, the step of applying the pressure applies a pressure with a surface load in a range of 10 $N/cm^2$ through 10,000 $N/cm^2$.

16. A method according to claim 15, wherein the range of pressure is preferably in a range of 500 $N/cm^2$ through 5,000 $N/cm^2$.

17. A method according to claim 1, wherein the step of maintaining the pressure holds the pressure for a predetermined time in a range between 0.5 seconds and 5 minutes.

18. A method according to claim 17, wherein the time is in a range between 2 seconds and 2 minutes.

19. A method according to claim 1, wherein the step of applying pressure includes utilizing pressure plates for applying the pressure, said pressure plates being maintained at a temperature range of between $-50°$ C. through $160°$ C.

20. A method according to claim 1, wherein the step of applying the pressure applies the pressure at a reshaping rate of a range of 0.1 mm/sec to 100 mm/sec.

21. A method according to claim 20, wherein the reshaping rate is in a range of 1 mm/sec and 50 mm/sec.

22. A method according to claim 1, wherein the step of applying energy to cancel and to create restoring forces applies heat in a range of $50°$ C. through $250°$ C.

23. A method according to claim 22, wherein the step of applying heat applies heat in the range of $120°$ C. through $180°$ C.

24. A method according to claim 1, wherein the first elevated temperature is not more than $200°$ C.

25. A method according to claim 2, wherein the first elevated temperature is in a temperature range of $50°$ C. and $110°$ C.

* * * * *